(12) United States Patent
Lee et al.

(10) Patent No.: US 11,631,870 B2
(45) Date of Patent: Apr. 18, 2023

(54) FUEL CELL POWER NET SYSTEM AND CONTROL METHOD THEREFOR

(71) Applicants: HYUNDAI MOTOR COMPANY, Seoul (KR); KIA CORPORATION, Seoul (KR)

(72) Inventors: Jong Hyun Lee, Yongin-si (KR); Keun Bong Ham, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/675,244

(22) Filed: Feb. 18, 2022

(65) Prior Publication Data

US 2022/0181656 A1 Jun. 9, 2022

Related U.S. Application Data

(62) Division of application No. 16/837,131, filed on Apr. 1, 2020, now Pat. No. 11,289,722.

(30) Foreign Application Priority Data

Dec. 6, 2019 (KR) .......................... 10-2019-0162091

(51) Int. Cl.
*H01M 8/04223* (2016.01)
*H01M 8/04858* (2016.01)
(Continued)

(52) U.S. Cl.
CPC ......... *H01M 8/04223* (2013.01); *B60L 58/40* (2019.02); *H01M 8/0488* (2013.01);
(Continued)

(58) Field of Classification Search
CPC ....................................................... B60L 58/40
See application file for complete search history.

(56) References Cited

U.S. PATENT DOCUMENTS 6,426,158 B1 7/2002 Pratt et al.
7,799,475 B2 9/2010 Wagner et al.
(Continued)

FOREIGN PATENT DOCUMENTS

KR 10-1836624 B1 3/2018
KR 10-1897338 B1 9/2018

*Primary Examiner* — Adam A Arciero
(74) *Attorney, Agent, or Firm* — McDonnell Boehnen Hulbert & Berghoff LLP

(57) ABSTRACT

Introduced is an fuel cell power net including a fuel cell configured to generate power through a reaction between a fuel gas and an oxidizing gas, a power storage device configured to be charged with power generated by the fuel cell or discharged to supply power, a main line configured to electrically connect the fuel cell and the power storage device to each other; a main relay disposed on the main line so as to break or make an electrical connection between the fuel cell and the power storage device, a bypass line which is branched from the main line, bypasses the main relay, and is connected to the power storage device, a bypass relay disposed on the bypass line so as to break or make an electrical connection of the bypass line, and a controller configured to control the main relay or the bypass relay such that the power stored in the storage device is supplied to the fuel cell while the power generation of the fuel cell is stopped.

6 Claims, 7 Drawing Sheets

(51) Int. Cl.
*H01M 8/04955* (2016.01)
*B60L 58/40* (2019.01)
*H01M 8/04089* (2016.01)

(52) U.S. Cl.
CPC ..... *H01M 8/04089* (2013.01); *H01M 8/0491* (2013.01); *H01M 8/0494* (2013.01); *H01M 8/04947* (2013.01); *H01M 8/04955* (2013.01); *H01M 2250/20* (2013.01)

(56) References Cited

U.S. PATENT DOCUMENTS

2006/0280977 A1 12/2006 Sakajo et al.
2007/0292724 A1 12/2007 Gilchrist

FUEL CELL POWER NET SYSTEM AND CONTROL METHOD THEREFOR

CROSS REFERENCE TO RELATED APPLICATIONS

The present application is a divisional U.S. application Ser. No. 16/837,131 filed Apr. 1, 2020, which claims priority to Korean Patent Application No. 10-2019-0162091, filed on Dec. 6, 2019, in the Korean Intellectual Property Office. The entire disclosure contents of these applications are herewith incorporated by reference into the present application.

BACKGROUND

1. Field

The present disclosure relates to a fuel cell power net system and a control method therefor, and relates to a technology for removing hydrogen in an air electrode during fuel cell restarting or FC Stop mode releasing.

2. Description of the Prior Art

A fuel cell converts chemical energy into electrical energy by using an oxidation-reduction reaction between hydrogen and oxygen supplied by a hydrogen feeder and an oxygen feeder, respectively. The fuel cell includes a fuel cell stack for generating electrical energy and a cooling system for cooling the same.

That is, hydrogen is supplied to an anode side of a fuel cell, and an oxidation reaction of the hydrogen occurs in an anode to generate hydrogen ions (protons) and electrons. The generated hydrogen ions and electrons move to a cathode through an electrolyte membrane and an external conductive wire, respectively. In the cathode, electrical energy is generated through an electrochemical reaction in which the hydrogen ions and the electrons moved from the anode and oxygen in the air participate.

A crossover phenomenon, in which a gas passes through an electrolyte membrane by the diffusion of the gas according to a partial pressure difference, occurs in the fuel cell. Particularly, in the state in which the fuel cell stops to generate electric power, the supply of air to the cathode is blocked. Further, when the fuel cell start to generate electric power again and air is supplied to the cathode, hydrogen having crossed over from the anode to the cathode may be discharged to the outside through an air processing line.

Specifically, when high-concentration hydrogen is discharged to the outside, there is a risk that the hydrogen burns if static electricity or a flame occurs in an adjacent location. Further, there is a problem with the relevant regulations for regulating the hydrogen concentration of a discharged gas.

The above information disclosed in this Background section is only for enhancement of understanding of the background of the present disclosure, and should not be taken as acknowledgement that this information forms the prior art already known to a person skilled in the art.

SUMMARY

The present disclosure has been proposed in order to solve the above-mentioned problems in the prior art, and an aspect of the present disclosure is to provide a fuel cell power net system and a control method therefor, wherein the system moves hydrogen, which has crossed over from an anode side to a cathode side, to the anode side again in the state in which the power generation of the fuel cell is stopped.

In order to achieve the aspect described above, an fuel cell power net system according to the present disclosure includes: a fuel cell configured to generate power through a reaction between a fuel gas and an oxidizing gas; a power storage device configured to be charged with power generated by the fuel cell or discharged to supply power; a main line configured to electrically connect the fuel cell and the power storage device to each other; a main relay disposed on the main line so as to break or make an electrical connection between the fuel cell and the power storage device; a bypass line which is branched from the main line, bypasses the main relay, and is connected to the power storage device; a bypass relay disposed on the bypass line so as to break or make an electrical connection of the bypass line; and a controller configured to control the main relay or the bypass relay such that the power stored in the storage device is supplied to the fuel cell while the power generation of the fuel cell is stopped.

The main line includes: a main cathode line configured to connect a cathode of the fuel cell to a cathode of the power storage device; and a main anode line configured to connect an anode of the fuel cell to an anode of the power storage device. The main relay includes: a first main relay disposed on the main cathode line; and a second main relay disposed on the main anode line.

At least one of the main cathode line or the main anode line has a diode configured to allow an electric current only in one direction. The bypass line is branched from the main cathode line or the main anode line, which has the diode, and bypasses both the diode and the first main relay or the second main relay.

The fuel cell power net system may further include: a cathode COD line branched from the main cathode line at a fuel cell side with reference to the first main relay; and an anode COD line branched from the main anode line at the fuel cell side with reference to the second main relay; and a COD resistor connected to each of the cathode COD line and the anode COD line so as to consume power.

The fuel cell power net system may further include a first COD relay disposed on the cathode COD line or the anode COD line so as to break or make an electrical connection.

The fuel cell power net system may further include a second COD relay connected to the cathode COD line or the anode COD line so as to bypass the first COD relay and configured to break or make an electrical connection, wherein the second COD relay may have an allowed current or allowed power relatively smaller than that of the first COD relay.

The fuel cell power net system may further include a current restriction resistor disposed on the bypass line so as to form an electrical potential difference between a front end and a rear end thereof when the electrical connection of the bypass line is allowed.

The fuel cell power net system may further include a COD resistor disposed on the bypass line so as to consume power, wherein the bypass relay may be positioned at a power storage device side of the bypass line with reference to the COD resistor.

The fuel cell power net system may further include: a connection line configured to connect the bypass line between the COD resistor and the bypass relay to the main cathode line or the main anode line between the first main relay or the second main relay and the diode; and a first COD relay and a second COD relay positioned between the COD resistor and a point at which the connection line is branched from the bypass line, and connected in parallel to each other so as to break or make an electrical connection, wherein the second COD relay may have an allowed current or allowed power relatively smaller than that of the first COD relay.

The fuel cell power net system may further include a current sensor positioned between the fuel cell and a point at which the bypass line is branched from the main line, so as to sense a current output from or input into the fuel cell.

The fuel cell power net system may further include: a bidirectional converter connected to the fuel cell through the main line; and a low-voltage converter positioned between the bidirectional converter and the power storage device so as to convert power converted by the bidirectional converter into a relative low potential, wherein the power storage device is a low-voltage battery which is connected to the low-voltage converter and is charged with or discharges power at the relative low potential, the main line includes a first main line and a second main line, and the bypass line is branched from the first main line and is connected to a first battery line of the low-voltage battery, and a second battery line of the low-voltage battery is connected to the second main line and has a battery relay configured to break or make an electrical connection of the second battery line.

In order to achieve the aspect described above, a method for controlling the fuel cell power net system includes: stopping power generation of the fuel cell by shut-down of the fuel cell or by entry thereof to an FC Stop mode; in a state in which the power generation of the fuel cell is stopped, supplying power stored in the power storage device to the fuel cell so as to move cathode-side hydrogen to an anode side; and generating power through a reaction between a fuel gas and an oxidizing gas in the fuel cell.

The stopping of the power generation of the fuel cell may further include performing a shut-down control for decreasing a voltage of the fuel cell when the power generation of the fuel cell is stopped by the shut-down of the fuel cell. In the performing of the shut-down control, by closing the first COD relay disposed on the COD line branched from the main line, a voltage of the fuel cell is reduced to a preconfigured first voltage by using the COD resistor of the COD line; a voltage of the fuel cell is reduced to a preconfigured second voltage in a state in which the second COD relay, bypassing the first COD relay and having an allowed current or allowed power relatively smaller than that of the first COD relay, is closed while opening the first COD relay and the first main relay disposed on the main cathode line of the main line; and the second main relay disposed on the main anode line of the main line is maintained in an opened state.

In the moving of the cathode-side hydrogen to the anode side, power stored in the power storage device may be supplied to the fuel cell at intervals of a preconfigured period or when power of the fuel cell is generated by start-up of the fuel cell or release of the FC Stop mode.

In the moving of the cathode-side hydrogen to the anode side, the bypass relay is closed and the bidirectional converter positioned between the fuel cell and the power storage device may be controlled to discharge the power storage device.

In the moving of the cathode-side hydrogen to the anode side, a preconfigured time may be maintained in a state in which a voltage of the main line is within a preconfigured voltage range, or the power storage device may be discharged until an integral value of a current flowing along the main line reaches a predetermined current amount.

In the generating of power, an oxidizing gas may be supplied to the fuel cell, the bypass relay may be opened, and the first main relay disposed on the main cathode line of the main line may be closed.

According to the fuel cell power net system and the control method therefor according to the present disclosure, hydrogen, having crossed over to a cathode side, can be moved to an anode side again and thus hydrogen discharged to the air can be reduced. Therefore, it is possible to reduce the danger of combustion due to hydrogen discharging and improve fuel efficiency.

BRIEF DESCRIPTION OF THE FIGURES

The above and other aspects, features and advantages of the present disclosure will be more apparent from the following detailed description taken in conjunction with the accompanying drawings, in which.

DETAILED DESCRIPTION

Figure 1:
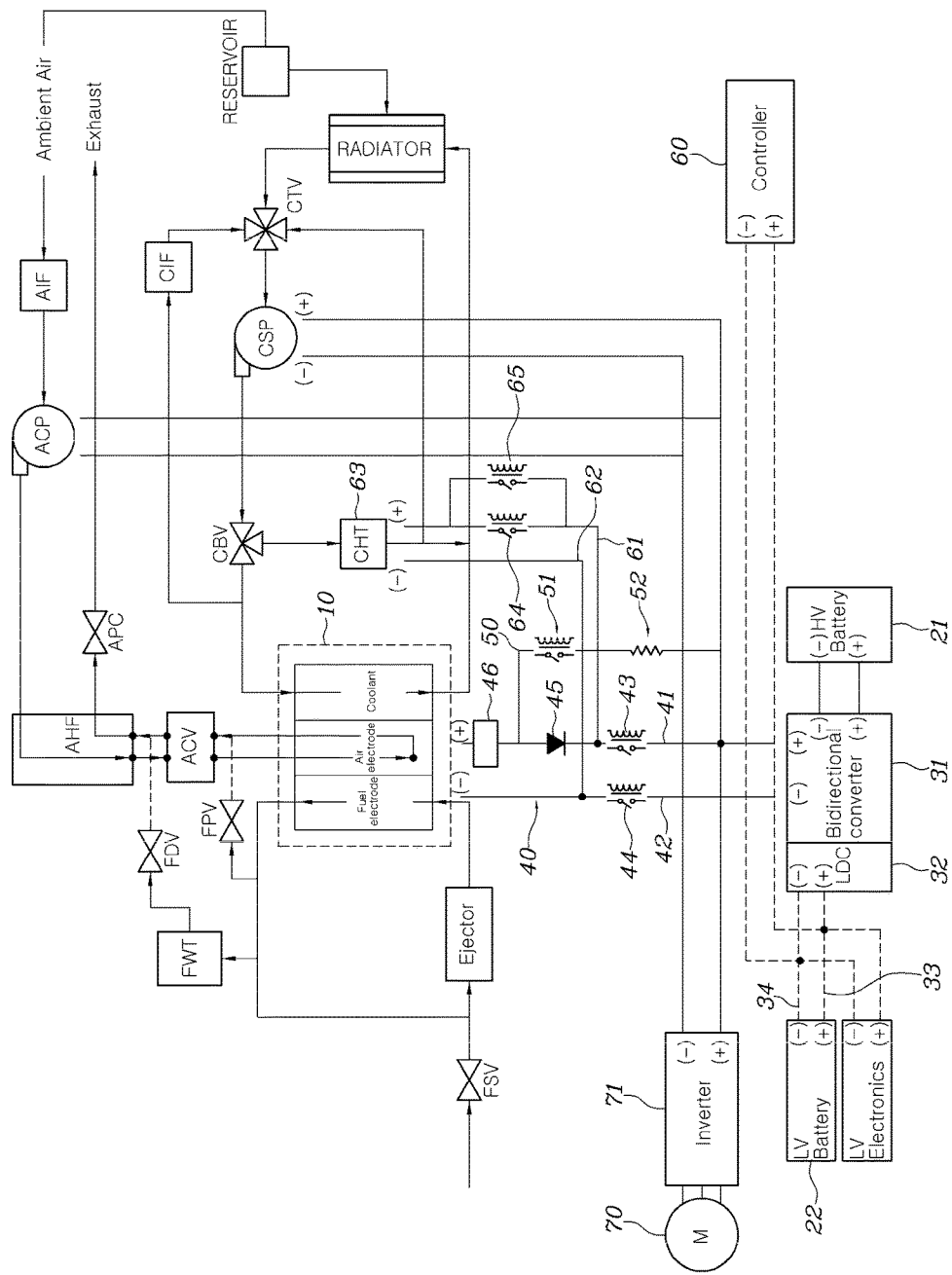
FIG. 1 illustrates a configuration of a fuel cell power net system according to one embodiment of the present disclosure.

A specific structural or functional description of embodiments of the present disclosure disclosed in the specification or application are given merely for the purpose of describing the embodiment according to the present disclosure. Therefore, the embodiments according to the present disclosure may be implemented in various forms, and the present disclosure should not be construed as being limited to the embodiments described in the specification or application Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to the other element, it should be understood that not only the element is directly connected or accessed to the other element, but also another element may exist therebetween. Contrarily, in the case where a component is referred to as being "directly connected" or "directly accessed" to other component, it should be understood that there is no component therebetween. The other expressions of describing a relationship between elements, i.e. "between" and "merely between" or "neighboring" and "directly neighboring", should be interpreted similarly to the above description.

In the present specification, the terms are merely used to describe a particular embodiment, and are not intended to limit the present disclosure. As used herein, the singular forms are intended to include the plural forms as well, unless the context clearly indicates otherwise. In the specification, it should be understood that the terms "include" or "have" indicate existence of a feature, a numeral, a step, an operation, an element, a part, or a combination thereof, and do not previously exclude the existences or probability of addition of one or more other features, numerals, steps, operations, elements, parts, or combinations thereof Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined in the specification.

Hereinafter, a preferred embodiment of the present disclosure will be described in detail with reference to the accompanying drawings. The same reference numerals presented in the drawings denote the same elements.

FIG. 1 illustrates a configuration of a fuel cell 10 power net system according to one embodiment of the present disclosure.

Referring to FIG. 1, the fuel cell 10 power net system according to one embodiment of the present disclosure includes a fuel cell 10 configured to generate power through a reaction between a fuel gas and an oxidizing gas, power storage devices 21 and 22 configured to be charged with power generated by the fuel cell 10 or discharged to supply power, a main line 40 configured to electrically connect the fuel cell 10 to the power storage devices 21 and 22, main relays 43 and 44 disposed on the main line 40 so as to break or make an electrical connection between the fuel cell 10 and the power storage devices 21 and 22, a bypass line 50 which is branched from the main line 40, bypasses the main relays 43 and 44, and is connected to the power storage devices 21 and 22, a bypass relay 51 disposed on the bypass line 50 so as to break or make an electrical connection of the bypass line 50, and a controller 60 configured to control the main relays 43 and 44 or the bypass relay 51 such that the power stored in the storage devices 21 and 22 is supplied to the fuel cell 10 while the power generation of the fuel cell 10 is stopped.

The fuel cell 10 generates power by a chemical reaction between hydrogen and oxygen. Specifically, a polymer electrolyte fuel cell (PEFC) 10 is used as driving energy of a fuel cell 10 vehicle (fuel cell electric vehicle (FCEV)) driven by a motor.

The polymer electrolyte fuel cell 10 is used in the form of a fuel cell 10 stack obtained by assembling a structure having several tens to hundreds of unit cells repeatedly stacked on one another and a clamping device for maintaining a proper clamping pressure, wherein each unit cell includes a membrane electrode assembly (MEA) in which an electrode, mainly made up of catalyst layers on which a electrochemical reaction occurs, is attached to each of opposite sides of a polymer electrolyte membrane through which hydrogen ions (protons, H+) move, a separation plate (bipolar plate (BP)) including a gas diffusion layer (GDL) for evenly distributing reaction gases and a passage for the movement of the reaction gases and a coolant, and a gasket for securing the airtightness of the reaction gases and the coolant.

Particularly, in the membrane electrode assembly (MEA) in which a direct electrochemical reaction occurs, a pair of electrodes are arranged with a polymer electrolyte membrane therebetween. Hydrogen serving as a fuel gas is supplied to a hydrogen electrode (anode) occupying a predetermined volume in the fuel cell 10 stack, and air including oxygen serving as an oxidizing gas is supplied to an air electrode (cathode).

The hydrogen supplied to the hydrogen electrode is split into hydrogen ions (proton, H+) and electrons (e−) by a catalyst in the hydrogen electrode attached to one surface of the polymer electrolyte membrane. Only the hydrogen ions selectively pass through the polymer electrolyte membrane, which is a cation exchange membrane, and moves the air electrode attached to the other surface of the polymer electrolyte membrane, and the electrons are transferred to the air electrode through an external conductive wire. A chemical reaction in the fuel cell 10 is represented by the following reaction formulas.

[Reaction in hydrogen electrode]$H_2 \rightarrow 2H^+ + 2e^-$

[Reaction in air electrode]$1/2 * O_2(g) + 2e^- \rightarrow H_2O(l)$

[Total reaction]$H_2(g) + 1/2 * O_2(g) \rightarrow H_2O(l) +$ electrical energy+thermal energy The fuel cell 10 may be connected to a driving system 70 such as a motor, a high-voltage battery (HV battery) 21, and a high-voltage balance-of-plants (BOPS) through the main line 40. The main line 40 may be maintained at the same voltage as an output voltage of the fuel cell 10 in the state in which the main line 40 is connected to the fuel cell 10.

The main relays 43 and 44 may be arranged on the main line 40 so as to break or make an electrical connection between the fuel cell 10 and the power storage devices 21 and 22. Particularly, the main relays 43 and 44 may be positioned between the fuel cell 10 and the driving system 70, the high-voltage battery 21, and the high-voltage BOPs, which are connected to the main line 40, so as to disconnect the fuel cell 10 from the main line 40 at the time of the breaking of the electrical connection.

Further, the fuel cell 10 is connected to the power storage devices 21 and 22 which can be charged and discharged, and the power storage devices 21 and 22 may be charged with power generated by the fuel cell 10 or may supply power to the outside while discharging the charged power. Here, the power storage devices 21 and 22 may be batteries or supercapacitors and, particularly, may be a high-voltage battery (HV battery) 21 or a low-voltage battery (LV battery) 22.

Particularly, a bidirectional converter 31 (bi-directional high-voltage DC-DC converter (BHDC)) is further arranged between the chargeable high-voltage battery 21 and the fuel cell 10 stack.

In addition, the fuel cell 10 system includes a fuel processing line (FPL) for supplying and discharging hydrogen serving as fuel to the fuel cell 10 stack, an air processing line (APL) for supplying and discharging air including oxygen serving as an oxidizer to the fuel cell 10 stack, a thermal management line (TML) for removing heat, which is a fuel cell 10 reaction byproduct of the fuel cell 10 stack, out of the fuel cell 10 system and managing water in the polymer electrolyte fuel cell 10, and balance-of-plants (BOPS) constituting the fuel processing line, the air processing line, and the thermal management line.

The high-voltage BOPs of the fuel cell 10 system includes a coolant stack pump (CSP), an air compressor (ACP), and a coolant heater (CHT) 63, which are connected to the main line 40 via the bidirectional converter 31 from the high-voltage battery 21 or the fuel cell 10 stack and are operated by a high-voltage source.

Further, low-voltage electronics (LV electronics) operated by a low voltage source may be connected to a low-voltage line (LV line) which connects the low-voltage battery (LV battery) 22 for normal operations of the LV electronics and an operation of the controller 60 to the low-voltage converter (low-voltage DC-DC converter (LDC)) 32 arranged between the low-voltage battery 22 and the bidirectional converter 31 and connected to the low-voltage battery 22.

Hydrogen, which is fuel supplied from a hydrogen storage device, is mixed with a post-reaction gas and then supplied to the fuel cell 10 through a fuel recirculation device such as an ejector in the fuel processing line, wherein the post-reaction gas includes unreacted hydrogen other than hydrogen which has participated and been used in the fuel cell 10 reaction in the hydrogen electrode of the fuel cell 10 stack, moisture generated by the fuel cell 10 reaction in the air electrode of the stack and diffused to the hydrogen electrode through the polymer electrolyte membrane, and nitrogen, among air supplied to the air electrode by the air compressor and mainly including oxygen and the nitrogen, which remains in the air electrode without participating in the fuel cell 10 reaction and is diffused from the air electrode to the hydrogen electrode through the polymer electrolyte membrane.

When moisture present in the fuel processing line a fuel gas is condensed as droplets while a fuel gas is circulated by the fuel recirculation device such as an ejector, the moisture is collected as liquid water by a water trap (FWT). When the liquid water becomes equal to or more than a predetermined amount, a drain valve (FDV) connected to the water trap switches from a closed state to an opened state for a predetermined time so that the liquid water is discharged to the air processing line and removed from the fuel processing line.

A purge valve (FPV) is in a closed state while the fuel cell 10 is operated in a normal state. In this case, as the amount of hydrogen consumed by a fuel cell 10 reaction increases, the concentration of hydrogen present in the hydrogen electrode gradually decreases. When the concentration of hydrogen present in the hydrogen electrode becomes equal to or lower than a predetermined level, the voltage of a fuel cell 10 stack output terminal becomes lower, compared with when the concentration of hydrogen present in the hydrogen electrode under the same load condition is equal to or higher than the predetermined level. Thus, it is necessary to introduce new hydrogen into the hydrogen electrode of the fuel cell 10 stack in order to maintain the concentration of hydrogen present in the hydrogen electrode at the predetermined level or higher.

To this end, the purge valve (FPV) switches from the closed state to a opened state for a predetermined time, a part of a post-reaction fuel gas of the hydrogen electrode of the fuel cell 10 stack is discharged to the air processing line and is removed from the fuel processing line, and an equivalent amount of new hydrogen as the volume of the discharged post-reaction fuel gas is introduced into the hydrogen electrode of the fuel cell 10 stack.

The part of the post-reaction fuel gas discharged to the air processing line is mixed with post-reaction air and then discharged to the outside, wherein the post-reaction air includes nitrogen and post-reaction oxygen other than oxygen participating in the fuel cell 10 reaction among air supplied by the air compressor to the air electrode of the fuel cell 10 stack for the fuel cell 10 reaction, and moisture which is a by-product of the fuel cell 10 reaction.

Air to be supplied by an air compressor is excessively supplied so that the concentration of hydrogen in a gas discharged to the outside as described above does not reach such a level as to become dangerous. Further, a time during which the purge valve (FPV) remains opened is reduced in proportion to the amount of air supplied by the air compressor, thereby preventing the hydrogen concentration of the gas discharged to the outside from reaching such a level as to become dangerous even when a gas corresponding to the part of the post-reaction fuel gas discharged to the air processing line is added.

Particularly, the hydrogen concentration corresponding to such a level as to become dangerous is prescribed by regulations, and the hydrogen concentration prescribed by the regulations may be, for example, defined as being a maximum of 8% and equal to or smaller than a three-second average of 4%.

When the fuel cell 10 enters a stop mode in which a normal operation thereof for generating power is finished, an operation of the air compressor is stopped and thus the introduction of air is stopped. Further, in the state in which an air cut-off valve (ACV), a drain valve (FDV), and the purge valve (FPV) are closed, the voltage of the stack decreases to a ground voltage level and thus a small amount of reacted oxygen, nitrogen, and water remain at the air electrode. In addition, after the air cut-off valve (ACV) is closed, a hydrogen supply valve (FSV) for supplying hydrogen to a hydrogen processing line may also be closed.

In a storage state in which the stop mode is maintained, the hydrogen electrode and the air electrode of the stack are stored while being electrically connected to each other through the COD resistor, which is embedded in the coolant heater (CHT) 63, and the small amount of oxygen remaining in the air electrode is completely removed and simultaneously hydrogen of reacted gases remaining in the hydrogen electrode is diffused to the air electrode by a crossover through the polymer electrolyte membrane and becomes closer to a state of equilibrium as a storage time becomes longer.

During the restarting process to make the fuel cell 10 enter a normal operation state and generate power again, the air cut-off valve (ACV) is opened and the air compressor operates to supply air to the air electrode of the fuel cell 10 stack. Here, the restarting process includes a time period in which a small amount of hydrogen, remaining in the air electrode within the stack while the stack voltage is elevated while the hydrogen having crossed over through the polymer electrolyte membrane from the storage state and having been diffused to the air electrode is discharged to the outside, coexists with oxygen in the air supplied by the air compressor. The larger the amount of air supplied to the air electrode in the stack through the air compressor, the shorter the time period described above.

The FC Stop mode is an idle state in which the power generation of the fuel cell 10 is temporarily stopped in a start-up state. In this mode, the operation of the air compressor is stopped until a stopped vehicle receives an accelerator signal and restarts. However, when the vehicle starts to run again, the air cut-off valve (ACV) waits for a quick response of the fuel cell 10 system, in the opened state and in the state in which a predetermined stack voltage is secured.

Particularly, it is possible to enter the FC Stop mode when the running speed of the vehicle is equal to or lower than a preconfigured speed or when the required power of the fuel cell 10 is equal to or smaller than preconfigured power and the state-of-charge (SOC) of the high-voltage battery 21 is equal to or larger than a preconfigured SOC.

Even in the FC Stop mode, the hydrogen concentration in the air electrode increases due to a hydrogen crossover phenomenon in which hydrogen of the hydrogen electrode is diffused to the air electrode through the polymer electrolyte membrane. Particularly, in order to discharge the hydrogen in the air electrode to the outside so as not to cause safety problems, the air compressor is periodically and repeatedly operated for a predetermine time to remove the hydrogen in the air electrode out of the stack.

Reaction gases of the hydrogen electrode and the air electrode, which occupy predetermined volumes in the fuel cell 10 stack for a vehicle, are discharged by opening and closing the air cut-off valve (ACV), the drain valve (FDV), and the purge valve (FPV).

In a normal state of the fuel cell 10, the hydrogen concentration of a gas discharged to the outside during the power generation of the fuel cell 10 or a restart after the stop thereof may satisfy a normal range. However, when a part of the polymer electrolyte membrane included in the fuel cell 10 is torn or degraded by the long use of the fuel cell 10, the amount of hydrogen crossing over to the air electrode is significantly increased and thus the hydrogen concentration of a gas discharged to the outside at the time of restart or FC Stop mode release may increase to such a level as to become dangerous.

In order to solve the problem described above, the controller 60 may control the main relays 43 and 44 or the bypass relay 51 such that power stored in the power storage devices 21 and 22 is supplied to the fuel cell 10 while the power generation of the fuel cell 10 is stopped.

The controller 60 according to an exemplary embodiment of the present disclosure may be implemented through a nonvolatile memory (not shown) configured to store an algorithm configured to control operations of various components of a vehicle or data regarding software instructions for reproducing the algorithm, and a processor (not shown) configured to perform operations described below by using the data stored in the memory. Herein, the memory and the processor may be implemented as individual chips. Alternatively, the memory and the processor may be implemented as a single chip in which the memory and the processor are integrated with each other. The processor may take the form of one or more processors.

Particularly, the bypass line 50 is branched from the main line 40 and is connected to the power storage devices 21 and 22, wherein, since the main line 40 bypasses the main relays 43 and 44, the main line 40 can electrically connect the fuel cell 10 to the power storage devices 21 and 22 even when the main relays 43 and 44 are opened.

The bypass relay 51 may be disposed on the bypass line 50 so as to make or break a connection between the fuel cell 10 and the power storage devices 21 and 22 through the bypass line 50.

Figure 2:
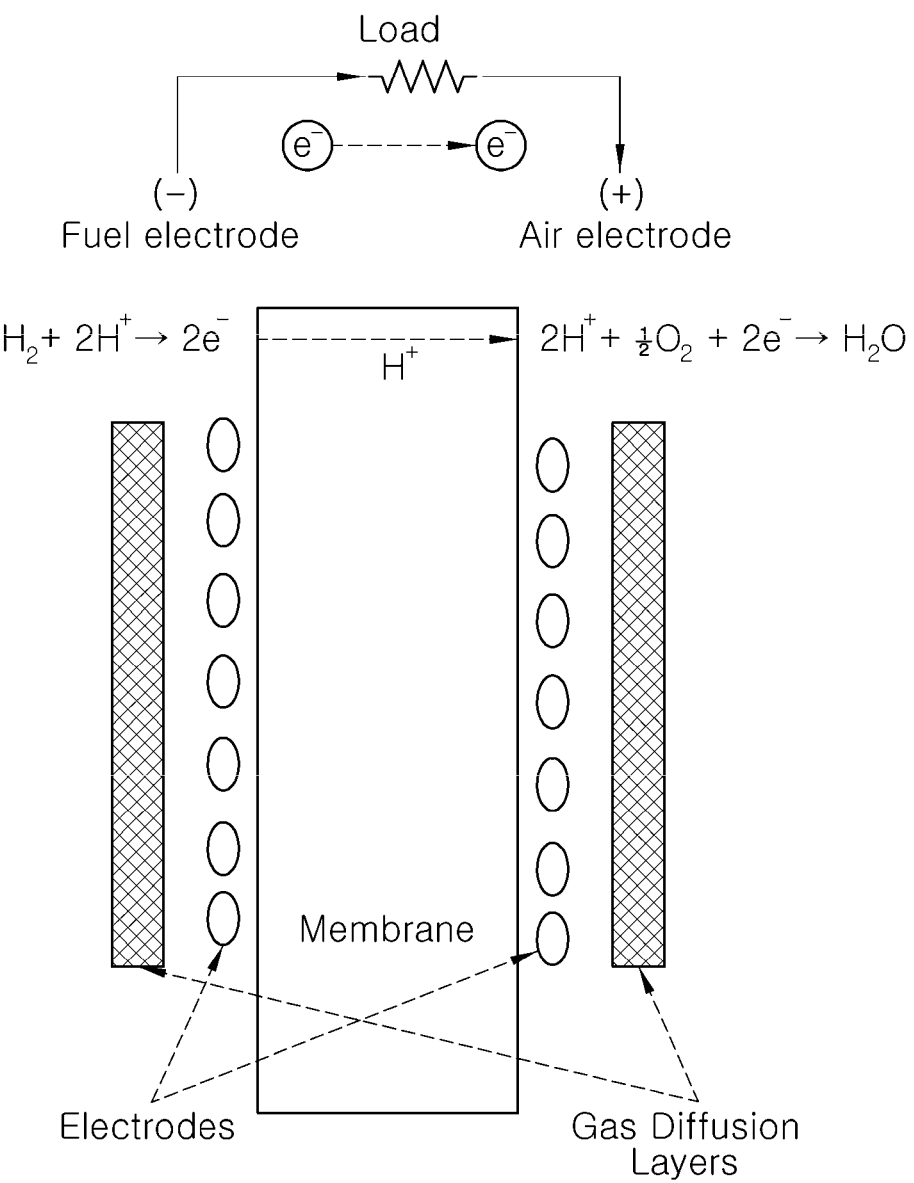
FIGS. 2 and 3 illustrate a power generation and a hydrogen movement reaction of a fuel cell according to one embodiment of the present disclosure.
Figure 3:
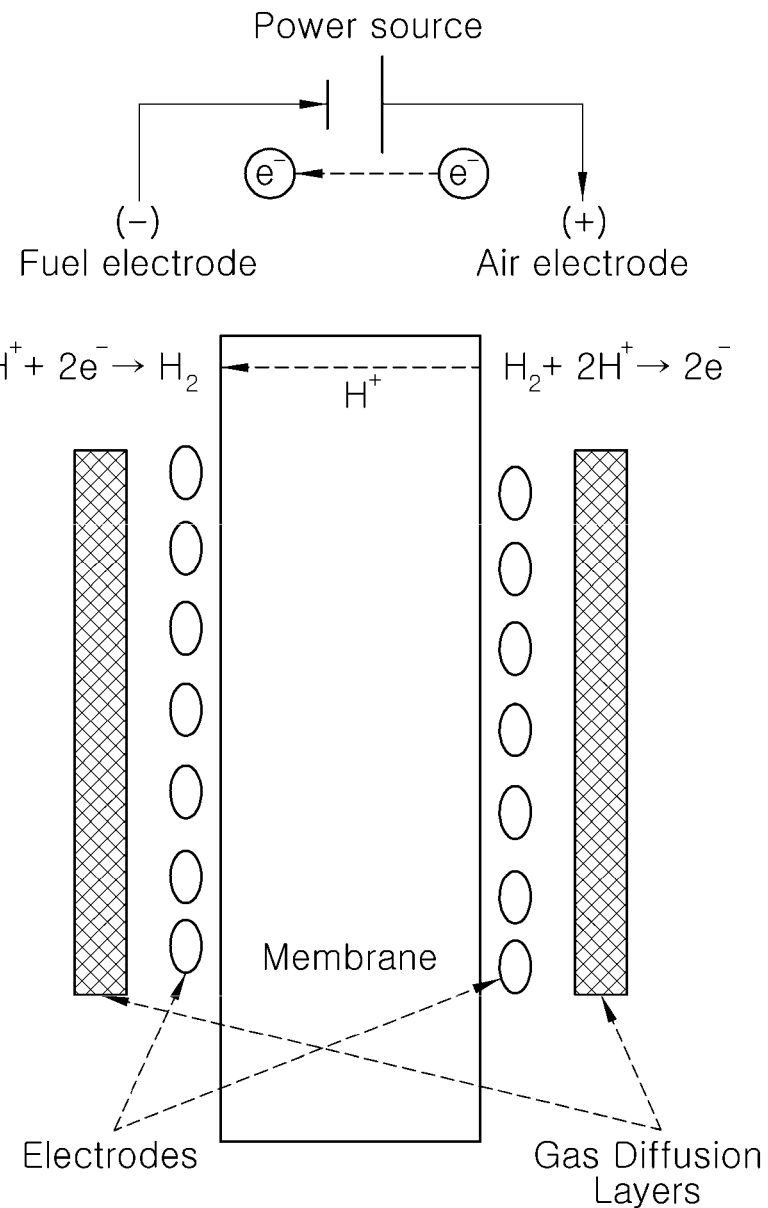

FIGS. 2 and 3 illustrate the power generation and hydrogen movement reaction of the fuel cell 10 according to one embodiment of the present disclosure.

Referring to FIGS. 2 and 3, when a voltage difference is generated by energy supplied to the fuel cell 10 from the outside, a potential is generated in the fuel cell 10. Thus, hydrogen ions (protons, $H^+$) generated during the oxidation of hydrogen move through a polymer electrolyte membrane, and then are recombined as new molecular hydrogen. This reaction is referred to as an electrochemical hydrogen pumping (EHP) reaction.

Specifically, the fuel cell 10 is one type of Galvanic cell in which a voltage difference is generated by a spontaneous reaction of an oxidation-reduction reaction so as to allow electricity to flow. Thus, in the hydrogen electrode and the air electrode, a positive electrode (plus electrode) or a negative electrode (minus electrode) may be electrically represented to alternate with each other.

There is no change in the electrical polarity of the hydrogen electrode and the air electrode of the polymer electrolyte fuel cell 10 not only in the fuel cell 10 reaction for generating power illustrated in FIG. 2 but also in the EHP reaction in which power is consumed by a power source, illustrated in FIG. 3.

That is, since the polarity of electric power components connected to the fuel cell 10 is not changed both in the fuel cell 10 reaction and in the EHP reaction, the components of the fuel cell 10 power net system can be used as they are.

In relation to the current flow direction between the fuel cell 10 stack and the bidirectional converter 31 and between the fuel cell 10 stack and an inverter 71, in the power generation process of generating power and the EHP process of consuming power, current flow directions to the fuel cell 10 stack are opposite to each other as current flow directions in charging and discharging of the high-voltage battery 21 are opposite to each other. That is, in the case of the power generation, the fuel cell 10 stack serves as a power source, and in the case of the EHP, the fuel cell 10 stack serves as a resistor by a separate power source. In this regard, the polarity is not changed even when the current flow direction is reversed.

Further, on the basis of a characteristic of the polymer electrolyte fuel cell 10 in which the movement of hydrogen ions (protons, $H^+$) is affected by the amount and distribution of moisture in the electrolyte membrane, the current flow amount reaches the maximum value and then decreases in a situation in which moisture is not supplied from the outside of the fuel cell 10 stack.

Figure 4:
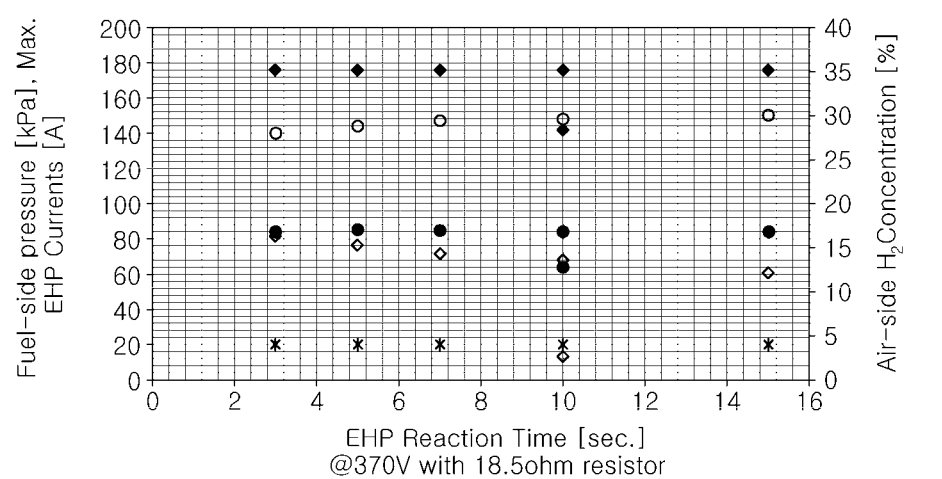
FIG. 4 illustrates a state of an air electrode and a hydrogen electrode according to a hydrogen movement reaction of a fuel cell in one embodiment of the present disclosure.

FIG. 4 illustrates a state of an air electrode and a hydrogen electrode according to a hydrogen movement reaction of the fuel cell 10 in one embodiment of the present disclosure.

As illustrated in FIG. 4, as a result of performing an EHP control while the power generation of the fuel cell 10 is stopped, the hydrogen concentration of the air electrode is significantly reduced. Particularly, an experimental condition is an application of a voltage of 370V to the fuel cell 10 through the high-voltage battery 21. It is possible to identify an effect in which more than half of the hydrogen concentration of the air electrode is reduced even when the EHP control is maintained only for three seconds.

Further, in the case of the hydrogen electrode, it can be identified that a pressure after the EHP control becomes higher than that before the EHP control. Therefore, it can be identified that hydrogen of the air electrode moves to the hydrogen electrode. Particularly, fuel efficiency can also be increased by collecting hydrogen to be charged.

Specifically, referring to FIG. 1, the main line 40 may include: a main cathode line 41 configured to connect a cathode of the fuel cell 10 to cathodes of the power storage devices 21 and 22; and a main anode line 42 configured to connect an anode of the fuel cell 10 to anodes of the power storage devices 21 and 22. The main relays 43 and 44 may include a first main relay 43 disposed on the main cathode line 41, and a second main relay 44 disposed on the main anode line 42.

The main cathode line 41 may connect the cathode of the fuel cell 10 to the cathodes of the power storage devices 21 and 22 (particularly, a positive electrode of the bidirectional converter 31), and the main anode line 42 may connect the anode of the fuel cell 10 to the anodes of the power storage devices 21 and 22 (particularly, a negative electrode of the bidirectional converter 31).

The first main relay 43 is disposed on the main cathode line 41, and the second main relay 44 is disposed on the main anode line 42. The first main relay 43 and the second main relay 44 may make or break a connection of the main cathode line 41 and a connection of the main anode line 42, respectively.

At least one of the main cathode line 41 or the main anode line 42 has a diode 45 configured to allow an electric current only in one direction. The bypass line 50 may be branched from the main cathode line 41 or the main anode line 42, which has the diode, and may bypass both the diode 45 and the first main relay 43 or the second main relay 44.

The diode 45 is disposed on the main cathode line 41, and may allow a current output only from the fuel cell 10 toward the main cathode line 41. Therefore, a reverse current may be prevented from being input into the fuel cell 10.

The bypass line 50 may be branched from the main cathode line 41 at a fuel cell 10 side with reference to the diode 45. Therefore, the bypass line 50 may bypass both the first main relay 43 and the diode 45, and a current may flow from the high-voltage battery 21 to the fuel cell 10 via the bypass line 50.

The fuel cell 10 power net system may further include: a cathode COD line 61 branched from the main cathode line 41 at the fuel cell 10 side with reference to the first main relay 43, an anode COD line 62 branched from the main anode line 42 at the fuel cell 10 side with reference to the second main relay 44, and a COD resistor, which is embedded in the coolant heater (CHT) 63, but not specifically shown, connected to each of the cathode COD line 61 and the anode COD line 62 so as to consume power.

The COD resistor may be connected to the coolant heater (CHT) 63, and may be immersed in cooling water for cooling the fuel cell 10. The COD resistor may consume power to generate heat and may be cooled by the circulation or flow of the cooling water. The COD resistor is configured to consume power of the fuel cell 10 so as to quickly reduce the voltage of the fuel cell 10.

The COD resistor may be connected to the main cathode line 41 via the cathode COD line 61. Particularly, the COD resistor may be connected to the main cathode line 41 in a position between the diode 45 and the first main relay 43. Further, the COD resistor may be connected to the main anode line 42 via the anode COD line 62. Particularly, the anode COD line 62 may be connected to the main anode line 42 at the fuel cell 10 side rather than at a second main relay 44 side.

Therefore, the COD resistor may quickly reduce the voltage of the fuel cell 10 by consuming power of the fuel cell 10 even when both the first main relay 43 and the second main relay 44 are opened.

The fuel cell 10 power net system may further include a first COD relay 64 disposed on the cathode COD line 61 or the anode COD line 62 so as to break or make an electrical connection.

The first COD relay 64 may be arranged on the cathode COD line 61 so as to make or break the connection between the COD resistor and the main cathode line 41. The first COD relay 64 is a normal opened-type generally maintaining an opened state, and may be controlled to be closed to make an electrical connection.

The fuel cell 10 power net system may further include a second COD relay 65 connected to the cathode COD line 61 or the anode COD line 62 so as to bypass the first COD relay 64 and configured to break or make an electrical connection, wherein the second COD relay 65 may have an allowed current or allowed power relatively smaller than that of the first COD relay 64.

Contrary to the first COD relay 64, the second COD relay 65 is a normal closed-type generally maintaining a closed state, and may be controlled to be opened to break an electrical connection. That is, when there is no control as in a shut-down state of the fuel cell 10, the second COD relay 65 may be closed to make an electrical connection.

In other words, the second COD relay 65 and the first COD relay 64 may be connected to each other in parallel on the cathode COD line 61. Even when only one of the first COD relay 64 and the second COD relay 65 is closed, the COD resistor is connected to the main cathode line 41 to allow a current to flow.

Particularly, the second COD relay 65 may have an allowed current or allowed power relatively smaller than that of the first COD relay 64. Therefore, the speed of the power consumption or voltage reduction of the fuel cell 10 in the state in which only the first COD relay 64 is closed may be higher than in the state in which only the second COD relay 65 is closed.

The fuel cell 10 power net system may further include a current restriction resistor 52 disposed on the bypass line 50 so as to form an electrical potential difference between a front end and a rear end thereof when the electrical connection of the bypass line 50 is allowed.

The current restriction resistor 52 is configured to restrict an inrush current, which is a current rapidly increasing through the bypass line 50 when the bypass relay 51 is closed. The current restriction resistor 52 may be a resistor, an NTC thermistor, etc.

Since the resistance of the current restriction resistor 52 may be in proportion to the time necessary for maintaining an EHP reaction, the current restriction resistor 52 is configured to have proper resistance in consideration of the time required to start up the fuel cell 10. For example, the current restriction resistor 52 may be an 18.5 ohm (1) resistor, and may be a metal clad resistor to which a heat-radiating plate for removing resistance heat is attached.

The current restriction resistor 52 may form an electric potential difference between the front end and the rear end thereof to reduce a voltage applied to the fuel cell 10 by the high-voltage battery 21, thereby preventing an inrush current from being generated in the fuel cell 10.

The fuel cell 10 power net system may further include a current sensor 46 positioned between the fuel cell 10 and a point at which the bypass line 50 is branched from the main line 40, so as to sense a current output from or input into the fuel cell 10.

Specifically, the current sensor 46 may sense a current output from the fuel cell 10 during the power generation of the fuel cell 10. Further, the current sensor 46 may sense a current input into the fuel cell 10 during the EPH reaction of the fuel cell 10.

Figure 5:
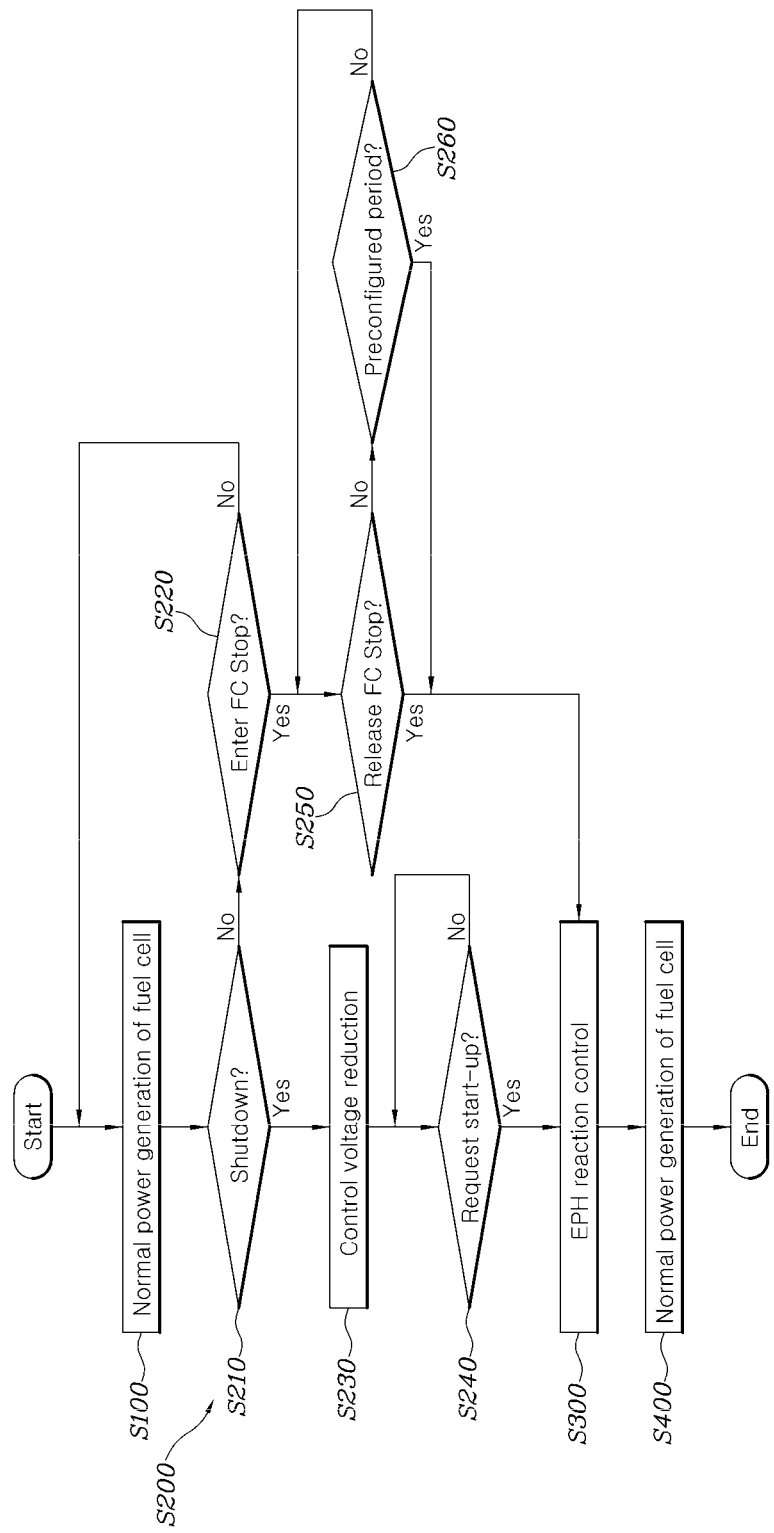
FIG. 5 is a flowchart of a method for controlling a fuel cell power net system according to one embodiment of the present disclosure.

FIG. 5 is a flowchart of a method for controlling the fuel cell 10 power net system according to one embodiment of the present disclosure.

Referring to FIG. 5, the method for controlling the fuel cell 10 power net system according to one embodiment of the present disclosure includes stopping power generation of the fuel cell 10 by shut-down of the fuel cell 10 or by entry thereof to an FC Stop mode (S200), in a state in which the power generation of the fuel cell 10 is stopped, supplying power stored in the power storage devices 21 and 22 to the fuel cell 10 so as to move cathode-side hydrogen to an anode side (S300), and generating power through a reaction between a fuel gas and an oxidizing gas in the fuel cell 10 (S400).

Before the stopping of the power generation of the fuel cell 10 (S200), the method may further include normally generating power in the fuel cell 10 (S100). In the normal generation of power in the fuel cell 10 (S100), the fuel cell 10 may be supplied with a fuel gas and an oxidizing gas and may generate power by a chemical reaction therebetween in the fuel cell 10.

In the stopping of the power generation of the fuel cell 10 (S200), the power generation may be stopped by an input of a shut-down signal for the fuel cell 10 (S210). When the power generation is stopped by the shut-down, a shut-down control for reducing the voltage of the fuel cell 10 while removing oxygen in the fuel cell 10 may be performed (S230).

Further, in the stopping of the power generation of the fuel cell 10 (S200), the fuel cell 10 may enter an FC Stop mode in which the power generation is temporarily stopped during start-up of the fuel cell 10 (S220). In the case of the entry to the FC Stop mode, only air to be supplied to the fuel cell 10 may be cut off.

The stopping of the power generation of the fuel cell 10 (S200) may further include performing a shut-down control for reducing the voltage of the fuel cell 10 (S230) when the power generation of the fuel cell 10 is stopped by the shut-down of the fuel cell 10 (S210).

In the performing of the shut-down control (S230), by closing the first COD relay 64 disposed on the COD line branched from the main line 40, the voltage of the fuel cell 10 may be reduced to a preconfigured first voltage by using the COD resistor of the COD line, the voltage of the fuel cell 10 may be reduced to a preconfigured second voltage in the state in which the second COD relay 65, bypassing the first COD relay 64 and having an allowed current or allowed power relatively smaller than that of the first COD relay 64, is closed while opening the first COD relay 64 and the first main relay 43 disposed on the main cathode line 41, and the second main relay 44 disposed on the main anode line 42 of the main line 40 may be maintained in an opened state.

In the moving of the cathode-side hydrogen to the anode side (S300), power stored in the power storage devices 21 and 22 may be supplied to the fuel cell 10 at intervals of a preconfigured period (S260) or when power of the fuel cell 10 is generated by start-up of the fuel cell 10 (S240) or release of the FC Stop mode (S250).

In the state in which the power generation of the fuel cell 10 is stopped, the fuel cell 10 may be controlled to move the cathode-side hydrogen to the anode side at intervals of a preconfigured period or to move the cathode-side hydrogen to the anode side when the power generation of the fuel cell 10 is restarted by the start-up of the fuel cell 10 or the release of the FC Stop mode.

Specifically, when the power generation is stopped in the shut-down state of the fuel cell 10, the fuel cell 10 may be controlled to move the cathode-side hydrogen to the anode side when the fuel cell 10 is re-operated by inputting a start-up signal for the fuel cell 10 (S240).

When the power generation is stopped in the FC Stop mode of the fuel cell 10, the fuel cell 10 may be controlled to move the cathode-side hydrogen to the anode side when the power generation of the fuel cell 10 is restarted by release of the FC Stop mode. Alternatively, the fuel cell 10 may be controlled to move the cathode-side hydrogen to the anode side at intervals of a preconfigured period in the FC Stop mode. Therefore, the cathode-side hydrogen may be removed in preparation for release of the FC Stop mode, and thus the energy consumption of the entire fuel cell system may be reduced by reducing hydrogen discharged to the outside without participating in a fuel cell reaction during release of the FC Stop mode.

The moving of the cathode-side hydrogen to the anode side (S300) may induce the above-described EHP reaction to occur.

Particularly, in the moving of the cathode-side hydrogen to the anode side (S300), the bypass relay 51 may be closed, and the power storage devices 21 and 22 may be discharged by controlling the bidirectional converter 31 positioned between the fuel cell 10 and the power storage devices 21 and 22.

In the moving of the cathode-side hydrogen to the anode side (S300), a preconfigured time may be maintained in the state in which the voltage of the main line 40 is within a preconfigured voltage range, or the power storage devices 21 and 22 may be discharged until the integral value of a current flowing along the main line 40 reaches a predetermined current amount.

The preconfigured voltage range may be preconfigured based on a control voltage (G) obtained by adding a preconfigured offset (a) to an operation lowest-voltage (G) of the high-voltage BOPs or the inverter 71 connected to the motor. Particularly, the preconfigured voltage range may be preconfigured as a range $(G-\beta<=>G+\beta)$ obtained by adding or subtracting an error range ($\beta$) to or from the control voltage (G). That is, the bidirectional converter 31 may be controlled to have a constant voltage such that the voltage of the main line 40 connected to the power storage devices 21 and 22 is uniformly maintained as the control voltage (G).

The preconfigured time may be configured according to the preconfigured voltage range or the control voltage (G). Further, the preconfigured time may be appropriately adjusted in consideration of the resistance magnitude of the current restriction resistor 52 and the time required for a re-operation of the fuel cell 10.

The current flowing along the main line 40 may be a current input to the fuel cell 10, and may be represented using a value sensed by the current sensor 46.

In the generating of power (S400), an oxidizing gas may be supplied to the fuel cell 10, the bypass relay 51 may be opened, and the first main relay 43 disposed on the main cathode line 41 of the main line 40 may be closed.

When the moving of the cathode-side hydrogen to the anode side (S300) is completed, the power generation of the fuel cell 10 may be restarted by supplying the oxidizing gas to the fuel cell 10 (S400).

Specifically, the method for controlling the fuel cell 10 power net system during shut-down and restart of the fuel cell 10 according to one embodiment of the present disclosure may be shown as in the following Table 1.

TABLE 1

| Operation Step | First Main Relay | Second Main Relay | By-pass Relay | First COD Relay | Second COD Relay | ACP | CSP | CHT | ACV | FSV | Stack Voltage | BHDC Voltage |
|---|---|---|---|---|---|---|---|---|---|---|---|---|
| [Normal Operation] | Close | Close | Open | Open | Open | On | On | Off | Open | Open | High Voltage | High Voltage |
| [Normal → Stop] | Close | Close | Open | Close | Open | Off | On | On | Close | Open | High Voltage → Low Voltage | High Voltage → Low Voltage |
|  | Open | Close | Open | Open | Close | Off | Off | On | Close | Open | Low Voltage → Ground Voltage | Low Voltage |
|  | Open | Open | Open | Open | Close | Off | Off | On | Close | Close | Ground Voltage | Ground Voltage |
| [Stop] | Open | Open | Open | Open | Close | Off | Off | On | Close | Close | Ground Voltage | Ground Voltage |
| [Storage] | Open | Close | Open | Open | Open | Off | Off | Off | Close | Close | Ground Voltage | Ground Voltage → High Voltage |
| [Storage → Startup] | Open | Close | Close | Open | Open | Off | Off | Off | Close | Close | High Voltage | High Voltage |
| [EHP Reaction Start] | Open | Close | Open | Open | Open | Off | Off | Off | Close | Close | High Voltage | High Voltage |
|  | Open | Close | Open | Open | Open | Off | Off | Off | Open | Open | High Voltage | High Voltage |
| [EHP Reaction End] | Close | Close | Open | Open | Open | On | On | Off | Open | Open | High Voltage | High Voltage |
| [Startup] [Normal Operation] | Close | Close | Open | Open | Open | On | On | Off | Open | Open | High Voltage | High Voltage |

During a normal operation, both the first main relay 43 and the second main relay 44 may be closed, and all of the bypass relay 51, the first COD relay 64, and the second COD relay 65 may be opened.

When the fuel cell 10 is shut down, the controller 60 performs a stop process of the fuel cell 10, starting from cutting off power supplied to the motor by the inverter 71 and stopping the air compressor so as to prevent air from being supplied to the stack.

The controller 60 may adjust the voltage of the bidirectional converter 31 to reduce an output voltage of the fuel cell 10 stack, and may open the first main relay 43 when the output voltage of the stack is lower than a preconfigured output voltage.

Herein, the preconfigured output voltage is a value used to determine whether the high-voltage battery 21 can be charged, and may have various values depending on specifications of the stack or the high-voltage battery 21.

Further, the controller, which reduces the output voltage of the fuel cell 10 stack in order to charge the high-voltage battery 21, may control the output voltage at a preconfigured change rate such that the output voltage does not exceed a charge-allowance current value of the high-voltage battery 21.

Further, the controller 60 may quickly reduce the output voltage of the fuel cell 10 stack so as to maximally prevent the degradation of the stack resulting from the exposure of the fuel cell 10 to a high voltage at the beginning of shutdown in which the high voltage is present. To this end, the controller 60 closes the first COD relay 64 so as to allow power generated by the fuel cell 10 to be consumed through the coolant heater (CHT) 63 in which the COD resistor is embedded.

The coolant stack pump (CSP) may be operated at a minimum idle RPM in order to reduce resistance heat generated in the coolant heater (CHT) 63. The controller 60 may stop the operation of the coolant stack pump (CSP) when the output voltage of the fuel cell 10 stack is reduced and thus the resistance heat generated in the coolant heater (CHT) 63 becomes equal to or lower than a predetermined level.

When the voltage value of an output terminal of the fuel cell 10 stack is lower than the preconfigured charging voltage, the controller 60 opens the first main relay 43 and continuously closes the first COD relay 64, thereby reducing the output voltage of the fuel cell 10 stack. The controller 60 opens the first COD relay 64 when the output voltage is reduced to a predetermined degradation-prevention voltage at which the fuel cell 10 stack is prevented from being degraded. In addition, the controller 60 may maintain the output voltage of the fuel cell 10 stack in a grounded state by opening the first COD relay 64 and closing the second COD relay 65.

During finishing of the stop step, the controller 60 closes the hydrogen supply valve (FSV), opens the second main relay 44, and enters a storage state in which the fuel cell 10 stack and the coolant heater (CHT) 63 are electrically connected to each other through the second COD relay 65. In the storage state in which the stop mode is maintained, the hydrogen electrode and the air electrode of the stack are stored in the state in which the hydrogen electrode and the air electrode are electrically connected to each other through a resistance unit of the coolant heater (CHT) 63. Thus, a small amount of unreacted oxygen present in the air electrode is completely removed, and, simultaneously, hydrogen in a reaction gas present in the hydrogen electrode is diffused to the air electrode by crossover through the polymer electrolyte membrane, and thus the hydrogen concentration of the air electrode increases according to a storage time and gradually approaches a state of equilibrium.

When a start-up signal for the fuel cell 10 is input, the controller 60 uses power of the low-voltage battery 22 to open the second COD relay 65 and thereby break the electrical connection between the fuel cell 10 stack and the coolant heater (CHT) 63, and closes the second main relay 44 to first connect the fuel cell 10 stack to the main anode line 42 of the bidirectional converter 31 (BHDC) and thereby synchronize a base for two high-voltage sources (the fuel cell 10 stack and the high-voltage battery 21).

When a fuel cell 10-side voltage of the bidirectional converter 31 is controlled to be the predetermined voltage range (G−β<=>G+β) obtained by adding or subtracting an error range (β) to or from the control voltage (G), the controller 60 closes the bypass relay 51 so as to allow the high-voltage battery 21 to be electrically connected to the fuel cell 10 stack while bypassing the diode 45 through the bypass line 50.

In this case, power supplied from the bidirectional converter 31 (BHDC) to the fuel cell 10 stack causes an EHP reaction, thereby moving hydrogen of the air electrode to the hydrogen electrode and preventing hydrogen of the hydrogen electrode from crossing over to the air electrode.

The speed of movement of hydrogen from the air electrode to the hydrogen electrode through the EHP reaction is expressed as the form of a current in proportion to the magnitude of a voltage applied to the stack, and is measured by the current sensor 46. A current of the power supplied to the stack through the bypass line 50 for the EHP reaction is affected by the state of hydration (moisture) of the polymer electrolyte membrane in the fuel cell 10 stack during a storage state. When the fuel cell 10 stops a normal operation, the polymer electrolyte membrane may be stored in a completely hydrated state.

The controller 60 moves hydrogen of the air electrode to the hydrogen electrode through the EHP reaction for a predetermined time and then opens the bypass relay 51 so as to cut off power of the bypass line 50. Particularly, the controller may identify the end of the EHP reaction again by identifying a current value sensed by the current sensor 46.

Thereafter, the controller 60 opens the fuel supply valve (FSV) for supplying hydrogen serving as fuel to the fuel cell 10 stack and the air cut-off valve (ACV) for supplying air serving as an oxidizer, and simultaneously closes the first main relay 43 to connect the main cathode line 41. Further, the controller 60 operates the air compressor (ACP) and the coolant stack pump (CSP) and allows power generated in the fuel cell 10 stack to be supplied to the inverter 71 and the bidirectional converter 31.

Further, the method for controlling the fuel cell 10 power net system at the time of entry to and release of the FC Stop mode according to one embodiment of the present disclosure may be shown as in Table 2 below.

TABLE 2

| Operation Step | First Main Relay | Second Main Relay | By-pass Relay | First COD Relay | Second COD Relay | ACP | CSP | CHT | ACV | FSV | Stack Voltage | BHDC Voltage |
|---|---|---|---|---|---|---|---|---|---|---|---|---|
| [Normal Operation] | Close | Close | Open | Open | Open | On | On | Off | Open | Open | High Voltage | High Voltage |
| [Normal →FC Stop] | Close | Close | Open | Open | Open | Off | On | Off | Open | Open | High Voltage | High Voltage |
| [EHP Reaction Start] | Close | Close | Close | Open | Open | Off | On | Off | Open | Open | High Voltage | High Voltage |
| [EHP Reaction End] | Close | Close | Open | Open | Open | Off | On | Off | Open | Open | High Voltage | High Voltage |
| [Normal Operation] | Close | Close | Open | Open | Open | On | On | Off | Open | Open | High Voltage | High Voltage |

Specifically, in the case of the entry to the FC Stop mode, only a supply of air supplied to the fuel cell 10 stack are cut off, and the output voltage of the fuel cell 10 stack is not separately reduced.

That is, at the beginning of the entry to the FC Stop mode, the output voltage of the fuel cell 10 stack is a high voltage identical to an opened-circuit voltage (OCV) by hydrogen remaining in the stack and oxygen in air, the bidirectional converter 31 is also maintained in a high voltage state so as to operate a high-voltage BOPs, and in this situation, the bypass relay 51 is opened.

Power generated by the fuel cell 10 stack passes via the diode 45 through the main cathode line 41 and then charges the high-voltage battery 21 via the bidirectional converter 31. Alternatively, the power is provided to the high-voltage BOPs such as the coolant stack pump (CSP). Therefore, the output voltage of the fuel cell 10 stack is gradually reduced.

When the output voltage of the fuel cell 10 stack is gradually reduced and reaches a level (preferably, stack output voltage≤bidirectional converter 31 output voltage±δ (voltage deviation)) similar to that of the output voltage of the bidirectional converter 31, the bypass relay 51 may be closed to allow power output from the bidirectional converter 31 to bypass the diode 45 through the bypass line 50 and be then applied to the fuel cell 10 stack. Thus, an EHP reaction may occur in the fuel cell 10 stack. Herein, when the voltage deviation (δ) is excessively large, an inrush current by the voltage difference between two high-voltage sources becomes large. Therefore, the voltage deviation (δ) may be preconfigured at an accurate level through experiments.

When an FC Stop mode release signal (e.g. an accelerator signal or a transmission position signal) is input, the controller 60 may open the bypass relay 51 to disconnect the main cathode line 41, and may drive the air compressor to supply air to the fuel cell 10 stack, thereby controlling the fuel cell 10 to perform an normal operation for restarting the power generation of the fuel cell 10.

Figure 6:
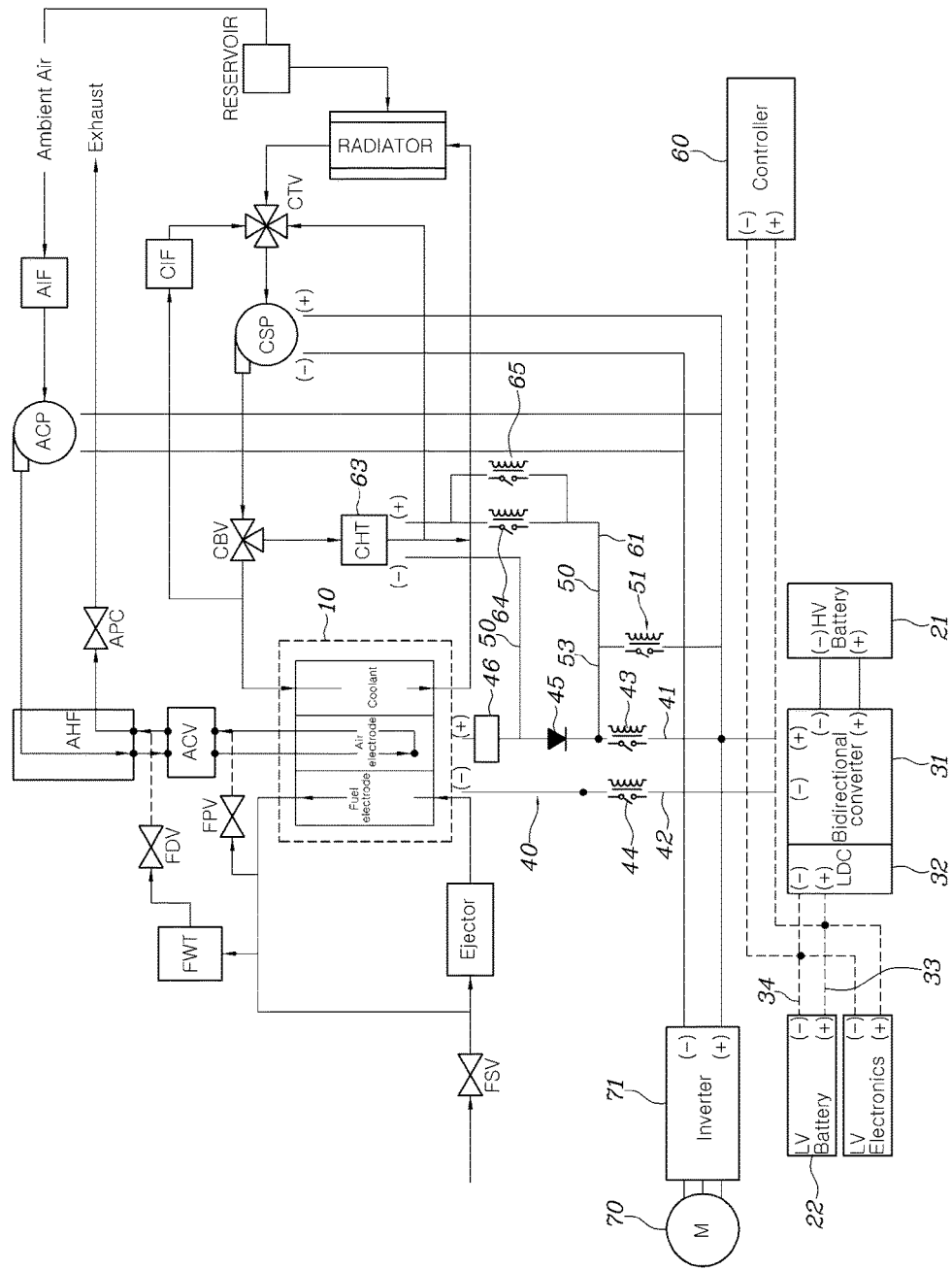
FIG. 6 illustrates a configuration of a fuel cell power net system according to another embodiment of the present disclosure.

FIG. 6 illustrates a configuration of a fuel cell 10 power net system according to another embodiment of the present disclosure.

Referring to FIG. 6, the fuel cell 10 power net system according to another embodiment of the present disclosure may not include the current restriction resistor 52 and may prevent an inrush current by using a COD resistor, instead of the current restriction resistor 52.

Specifically, the fuel cell 10 power net system may further include the COD resistor disposed on a bypass line 50 and consuming power, wherein a bypass relay 51 may be positioned at the power storage devices 21 and 22 side of the bypass line 50 with reference to the COD resistor.

The negative electrode of the COD resistor 63 may be moved from a main anode line 42 to a main cathode line 41 so as to be connected to the main cathode line 41. Both the negative electrode and the positive electrode of the COD resistor may be connected to the bypass line 50, which bypasses a diode 45 and a first main relay 43 on the main cathode line 41 and is connected to a bidirectional converter 31. That is, both the negative electrode and the positive electrode of the COD resistor may be connected to the bypass line 50 so as to serve as a resistor for restricting a current on the bypass line 50.

In this case, a COD control for quickly reducing the voltage of the fuel cell 10 stack is impossible. Thus, the system may further include a circuit including a separate relay or a separate line for connecting the negative of the COD resistor to the main anode line 42.

The fuel cell 10 power net system may further include a connection line 53 configured to connect the bypass line 50 between the COD resistor and the bypass relay 51 to the main cathode line 41 or the main anode line 42 between the first main relay 43 or the second main relay 44 and the diode 45, and a first COD relay 64 and a second COD relay 65 positioned between the COD resistor and a point at which the connection line 53 is branched from the bypass line 50, and connected in parallel to each other so as to break or make an electrical connection, wherein the second COD relay 65 may have an allowed current or allowed power relatively smaller than that of the first COD relay 64.

The connection line 53 may be connected from the bypass line 50 to the main cathode line 41 between the diode 45 and main relays 43 and 44. The first COD relay 64 and the second COD relay 65 connected in parallel to each other are positioned on the bypass line 50, particularly, on the bypass line 50 connected to the positive electrode of the COD resistor, and the connection line 53 may be branched between the first COD relay 64 or the second COD relay 65 and the bypass relay 51 and connected between the diode 45 and the main relays 43 and 44.

Specifically, the method for controlling the fuel cell 10 power net system during the shutdown and restart of the fuel cell 10 according to another embodiment of the present disclosure may be shown as in Table 3 below.

TABLE 3

| Operation Step | First Main Relay | Second Main Relay | Bypass Relay | First COD Relay | Second COD Relay | ACP | CSP | CHT | ACV | FSV | Stack Voltage | BHDC Voltage |
|---|---|---|---|---|---|---|---|---|---|---|---|---|
| [Normal Operation] | Close | Close | Open | Open | Open | On | On | Off | Open | Open | High Voltage | High Voltage |
| [Normal → Stop] | Close | Close | Open | Close | Open | Off | On | On | Close | Open | High Voltage → Low Voltage | High Voltage → Low Voltage |
| | Open | Close | Open | Open | Close | Off | Off | On | Close | Open | Low Voltage → Ground Voltage | Low Voltage |
| | Open | Open | Open | Open | Close | Off | Off | On | Close | Close | Ground Voltage | Ground Voltage |
| [Stop] | Open | Open | Open | Open | Close | Off | Off | On | Close | Close | Ground Voltage | Ground Voltage |
| [Storage] | Open | Close | Close | Close | Close | Off | Off | On | Close | Close | Ground Voltage | Ground Voltage |
| [Storage → Startup [EHP Reaction Start] | Open | Close | Close | Close | Close | Off | Off | On | Close | Close | Ground Voltage → G + α | Ground Voltage → G + α |
| | Close | Close | Close | Close | Close | Off | On | On | Close | Close | G + α → High Voltage | G + α → High Voltage |
| | Close | Close | Open | Open | Open | Off | On | Off | Close | Close | High Voltage | High Voltage |
| | Close | Close | Open | Open | Open | On | On | Off | Close | Close | High Voltage | High Voltage |
| [EHP Reaction End] [Startup] [Normal Operation] | Close | Close | Open | Open | Open | On | On | Off | Open | Open | High Voltage | High Voltage |

A description of the control method is mostly identical to that of the control method for the fuel cell 10 power net system according to one embodiment of the present disclosure as showed in Table 1. Therefore, only the difference will be described below.

When the fuel cell 10 starts up, a controller 60 closes the second main relay 44 so as to electrically connect the negative electrode of a fuel cell 10 stack output to the negative electrode of an output terminal of the bidirectional converter 31, thereby synchronizing a base for tow high-voltage sources.

The second COD relay 65 is maintained in an opened state, and thus the fuel cell 10 stack, the bidirectional converter 31, and the coolant heater (CHT) 63 are electrically connected. In addition, closing the first COD relay 64 may strengthen the electrical connection between the fuel cell 10 stack and the coolant heater (CHT) 63. This control may be selectively applied to the first COD relay 64 and the second COD relay 65 according to the magnitude of power or current which can pass therethrough.

Thereafter, the controller 60 closes the bypass relay 51 to connect the fuel cell 10 and the bidirectional converter 31 to each other through the bypass line 50. When the output voltage of the bidirectional converter 31 is higher than a stack output voltage, power for an EHP reaction may be immediately supplied to the fuel cell 10 stack.

When the output voltage of the bidirectional converter 31 starts to increase as the controller 60 starts a control of the bidirectional converter 31, power of the bidirectional converter 31 bypasses the diode 45 via the bypass line 50 and is then supplied to the fuel cell 10 stack, and the stack supplied with the power causes an EHP reaction to consume the supplied power, thereby reducing the hydrogen concentration of the air electrode.

That is, the controller 60 may form a path, which bypasses the diode 45 and is used to transfer power of the bypass line 50, and then may starts a control of the bidirectional converter 31 and gradually increase the output voltage of the bidirectional converter 31 such that the bypass relay 51, the first COD relay 64, and the second COD relay 65 are not damaged by a high current or high power.

The controller 60 starts to control the bidirectional converter 31 by a control voltage (D) obtained by adding a preconfigured offset (α) to an operation lowest-voltage (G) of an inverter 71 for supplying power to a motor. When the output voltage of the bidirectional converter 31 is equal to or higher than the operation lowest-voltage (G) of the inverter 71, the controller 60 performs a constant voltage control such that the output voltage of the bidirectional converter 31 remains constant within a range of a configured voltage of the bidirectional converter 31 for an EHP reaction±β (error).

In addition, a current value of power supplied to the stack from the bidirectional converter 31 for the EHP reaction changes depending on an output voltage of each of the stack and the bidirectional converter 31, a resistance value of the COD resistor 63 included in the coolant heater (CHT) 63, and a resistance value change of the stack due to the EHP reaction. Therefore, the controller 60 may configure and control the control change speed of the bidirectional converter 31 control voltage (D) in one or more steps through a feedback control using a current value measured by the current sensor 46. Therefore, the controller may select the most appropriate current amount range so as to minimize the additional time required for a start-up of the fuel cell 10 system including an EHP reaction.

When the voltage of the output terminal of the bidirectional converter 31 increases to a voltage capable of operating a coolant stack pump, the controller 60 may operate the coolant stack pump to remove resistance heat generated in the coolant heater 63 including the COD resistor. Further, when the first main relay 43 positioned on the main cathode line 41 is closed and the fuel cell 10 switches to a normal operation after the start-up process including an EHP reaction is finished, the operation power of the high-voltage BOPs is controlled to be maintained without being cut off.

When the control voltage (D) of the bidirectional converter 31 reaches to a level capable of performing the constant voltage control in which the control voltage (D) remains constant within a configured voltage±β (error) range, the controller 60 determines whether to additionally maintain an EHP reaction which can be identified through a current value of the current sensor 46 or whether a predetermined time measured by an internal timer is reached, and then opens the bypass relay 51 so as to finish the EHP reaction.

Thereafter, the controller 60 may open the first COD relay 64 and second COD relay 65 to break the electrical connection between the stack and the coolant heater 63, and may supply hydrogen and air to the stack to control a normal operation of the fuel cell 10 system while finishing the start-up process.

The method for controlling the fuel cell 10 power net system at the time of entry to and release of an FC Stop mode according to another embodiment of the present disclosure may be shown as in Table 4 below.

TABLE 4

| Operation Step | First Main Relay | Second Main Relay | Bypass Relay | First COD Relay | Second COD Relay | ACP | CSP | CHT | ACV | FSV | Stack Voltage | BHDC Voltage |
|---|---|---|---|---|---|---|---|---|---|---|---|---|
| [Normal Operation] | Close | Open | Open | Close | Open | On | On | Off | Open | Open | High Voltage | High Voltage |
| [Normal → FC Stop] | Close | Open | Open | Close | Open | Off | On | Off | Open | Open | High Voltage | High Voltage |
| [EHP Reaction Start] | Close | Close | Close | Close | Close | Off | On | Off | Open | Open | High Voltage | High Voltage |
| [EHP Reaction End] | Close | Open | Open | Close | Open | Off | On | Off | Open | Open | High Voltage | High Voltage |
| [Normal Operation] | Close | Open | Open | Close | Open | On | On | Off | Open | Open | High Voltage | High Voltage |

Figure 7:
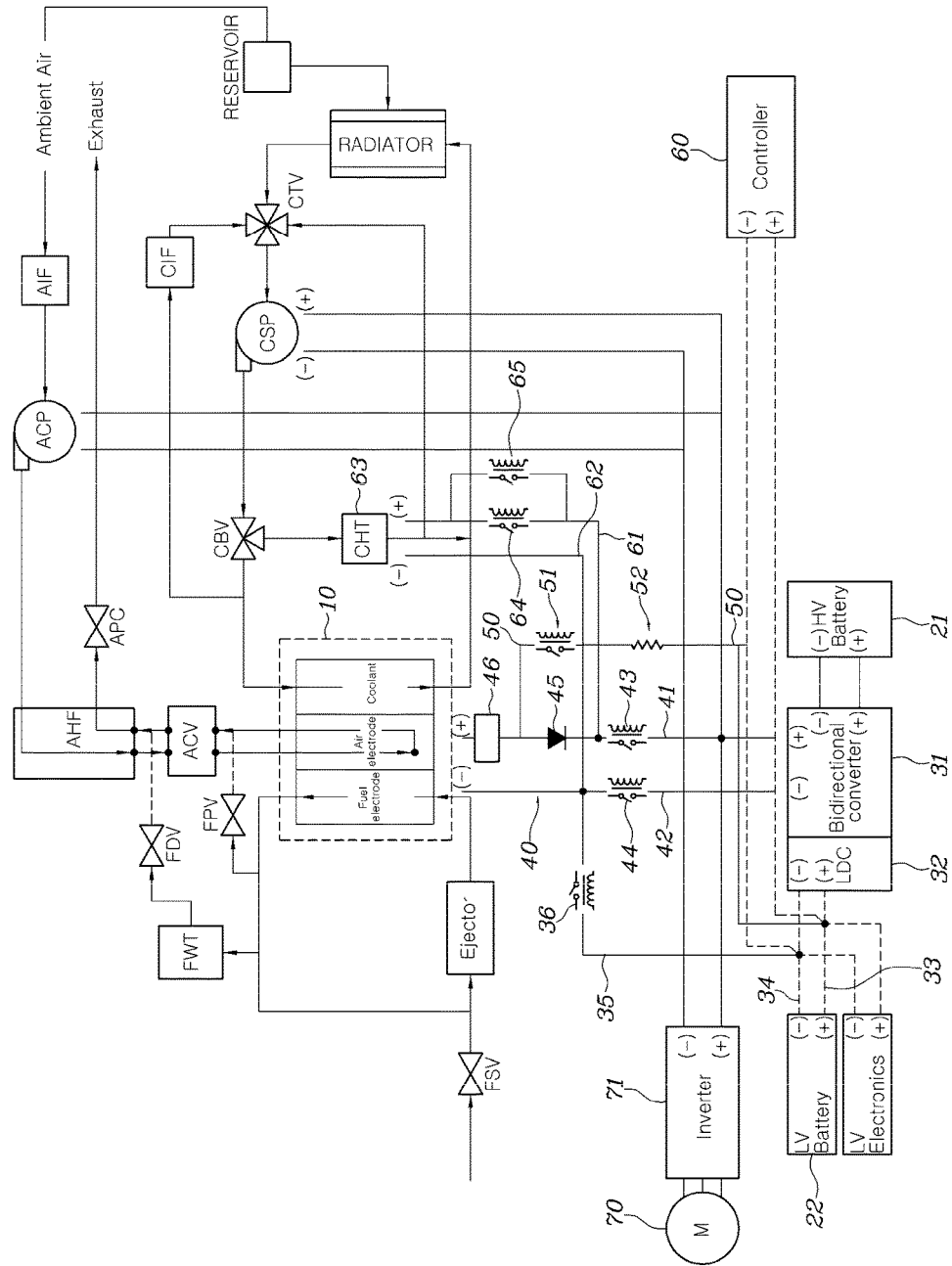
FIG. 7 illustrates a configuration of a fuel cell power net system according to another embodiment of the present disclosure.

FIG. 7 illustrates a configuration of a fuel cell 10 power net system according to another embodiment of the present disclosure.

Referring to FIG. 7, the fuel cell 10 power net system according to another embodiment of the present disclosure supplies power to a fuel cell 10 stack while discharging a low-voltage battery 22 among power storage devices 21 and 22.

Specifically, the power net system may further include a bidirectional converter 31 connected to the fuel cell 10 through a main line 40, and a low-voltage converter 32 positioned between the bidirectional converter 31 and the power storage devices 21 and 23 so as to convert power converted by the bidirectional converter 31 into a relative low potential, wherein the power storage devices 21 and 22 are low-voltage batteries (22) which are connected to the low-voltage converter 32 and are charged with or discharge power at the relative low potential, a main line 40 includes a first main line 40 and a second main line 40, a bypass line 50 is branched from the first main line 40 and is connected to a first battery line 33 of the low-voltage battery 22, and a second battery line 34 of the low-voltage battery 22 may be connected to the second main line 40, and may have a battery relay 36 configured to break or make an electrical connection of the second battery line 34.

The bidirectional converter 31 is connected to the low-voltage converter 32, independently of the high-voltage battery 21, and the low-voltage battery 22 is charged with a voltage converted into the low potential by the low-voltage converter 32. Here, the low potential of the low-voltage battery 22 may be, for example, 12 volts (V), and may be a voltage relatively lower than a relative high potential of a 300 to 400 volts (V) region of the high-voltage battery 21.

The first battery line 33 and the second battery line 34 may be connected to a cathode and an anode of the low-voltage battery 22, respectively, and connected to the low-voltage converter 32. Low-voltage BOPs may be electrically connected to the first battery line 33 and the second battery line 34.

Further, the bypass line 50 may be connected to the first battery line 33, a third battery line 35 may be connected between the second battery line 34 and the second main line 40, and a battery relay 36 may be disposed on the third battery line 35.

A controller 60 may control the battery relay 36 to be closed or opened such that power of the low-voltage battery 22 is supplied or blocked from being supplied to the fuel cell 10 stack.

Although the present disclosure has been described and illustrated with reference to the particular embodiments thereof, it will be apparent to a person skilled in the art that various improvements and modifications of the present disclosure can be made without departing from the technical idea of the present disclosure provided by the following claims.

The invention claimed is:

1. A method for controlling a fuel cell power net system, the method comprising:
   stopping power generation of a fuel cell by shut-down of the fuel cell or by entry thereof to a fuel cell stop mode;
   in a state in which the power generation of the fuel cell is stopped, supplying power stored in a power storage device to the fuel cell so as to move cathode-side hydrogen to an anode side; and
   generating power through a reaction between a fuel gas and an oxidizing gas in the fuel cell.

2. The method of claim 1, wherein the stopping of the power generation of the fuel cell further comprises:
   performing a shut-down control for decreasing a voltage of the fuel cell when the power generation of the fuel cell is stopped by the shut-down of the fuel cell,
   wherein, in the performing of the shut-down control, by closing a first COD relay disposed on a COD line branched from a main line, a voltage of the fuel cell is reduced to a preconfigured first voltage by using a COD resistor of the COD line;
   a voltage of the fuel cell is reduced to a preconfigured second voltage in a state in which a second COD relay, bypassing the first COD relay and having an allowed current or allowed power relatively smaller than that of the first COD relay, is closed while opening the first COD relay and a first main relay disposed on a main cathode line of the main line; and
   a second main relay disposed on a main anode line of the main line is maintained in an opened state.

3. The method of claim 1, wherein, in the moving of the cathode-side hydrogen to the anode side, power stored in the power storage device is supplied to the fuel cell at intervals of a preconfigured period or when power of the fuel cell is generated by start-up of the fuel cell or release of the fuel cell stop mode.

4. The method of claim 1, wherein in the moving of the cathode-side hydrogen to the anode side, a bypass relay is closed, and a bidirectional converter positioned between the fuel cell and the power storage device is controlled to discharge the power storage device.

5. The method of claim 4, wherein, in the moving of the cathode-side hydrogen to the anode side, a preconfigured time is maintained in a state in which a voltage of the main line is within a preconfigured voltage range, or the power storage device is discharged until an integral value of a current flowing along the main line reaches a predetermined current amount.

6. The method of claim 1, wherein, in the generating of power, the oxidizing gas is supplied to the fuel cell, a bypass relay is opened, and the first main relay disposed on the main cathode line of the main line is closed.

* * * * *